April 4, 1961
E. HAAS ET AL
2,977,640
APPARATUS FOR OBTAINING FILAMENTOUS MATERIAL
FROM VEGETABLE PRODUCTS
Filed June 17, 1957
2 Sheets-Sheet 1
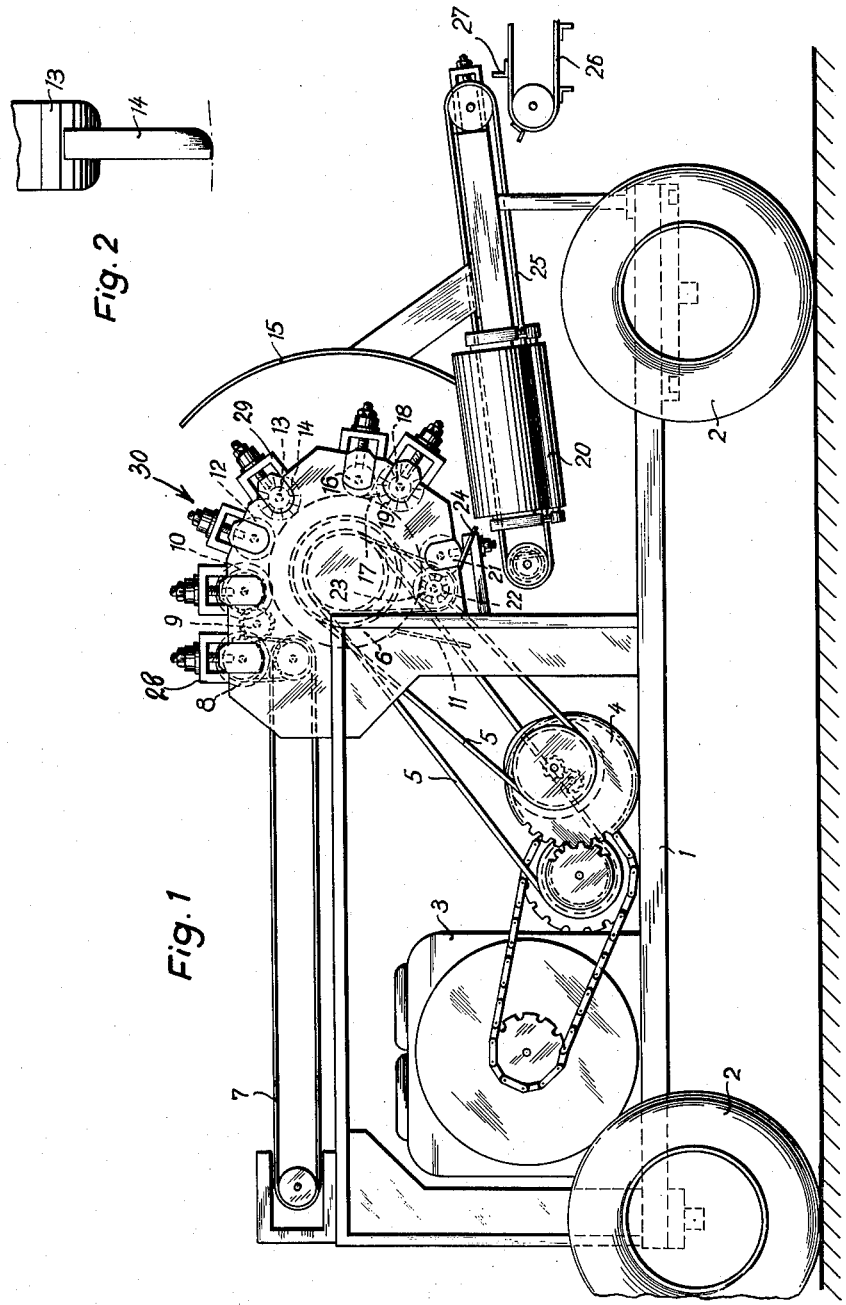
INVENTORS
EUGEN HAAS
WILLY ZINSER
WALDEMAR HAGMANN
PAUL LAUKHUF INVENTORS
EUGEN HAAS
WILLY ZINSER
WALDEMAR HAGMANN
PAUL LAUKHUF
BY Leon M. Strauss
AGT.

United States Patent Office 2,977,640
Patented Apr. 4, 1961

2,977,640

APPARATUS FOR OBTAINING FILAMENTOUS MATERIAL FROM VEGETABLE PRODUCTS

Eugen Haas, Eislingen (Fils), Willy Zinser, Vaihingen (Enz), Waldemar Hagmann, Geislingen (Steige), and Paul Laukhuf, Eislingen (Fils), Germany, assignors to Walter Ziehr, Stuttgart, Germany Filed June 17, 1957, Ser. No. 666,026

Claims priority, application Germany June 18, 1956

8 Claims. (Cl. 19—28)

This invention relates to an apparatus for disassociating or separating filamentous material from vegetable pulp present in lengthy vegetable products.

The invention is directed to an apparatus including treatment tools which rotate in one and the same direction and are disposed adjacent the location of line of contact with a feed conveyor arrangement, while at other locations of said feed arrangement there are provided means to remove or strip off desirable fibers from the pulp of said products.

The lengthy and inherently somewhat moist product adheres due to the pressure of a first treatment roll onto a feed conveyor band and is, therefore, entrained by said conveyor band around any bends or curvatures thereof without meeting any difficulties.

In accordance with the present invention the treatment or working tools may preferably be arranged at locations where a change in the direction of movement occurs, in particular at curved conveyor portions, in order to bring about an enhanced treatment effect.

It is one of the important objects of the present invention to provide means affording rapid and continuous processing of vegetable matter containing desirable fibers in a very efficacious apparatus, whose construction contributes to a greatly improved fiber yield as compared with heretofore applied separators and like known devices.

It is another object of this invention to provide means facilitating the treatment of vegetable and like products in very efficient, sequential operational steps about a feed mechanism along which the fibers of such products are separated or disassociated from the remaining vegetable pulp and juice and then diverted to further treatment devices.

Still another object of the present invention resides in the provision of means rendering the possibility of gradually opening up fibers of vegetable and like products in a treatment apparatus which is highly economical in operation, very practical and compact in construction as it takes up relatively little space and whose requirements for surveillance and maintenance are easily kept at a minimum.

A further object of the invention is to provide means conducive to a greatly improved apparatus structure for the uninterrupted and smooth treatment of vegetable and like products from which fibrous constituents are to be separated at a high yield, whereas other less desirable pulp and like matters will be thrown off and diverted from a predetermined path along which treatment tools or means are disposed for loosening up and drawing out filamentous material.

It is yet another object of the present invention to provide means contributing to an effective protection of the working surface of the treatment roll or rolls from any attack such as by the corrosive juices of the material being worked upon by the employment of a layer of hard chromium or similar highly resistant metal or material.

Still a further object of the invention is to provide means ensuring sufficient flexibility for the ledges or ribs of the scraping rolls by manufacturing same from elastic material, such as stainless steel, plastic, rubber and the like and attaching same in position by suitable clamping devices, screw arrangements, etc., recessed in the aforesaid rolls.

According to the invention the drive for the feed conveyor and treatment rolls may be effectuated by means of a common or power drive source and through the interposition of suitable gearings, chain or transmissions etc., an electro-motor, combustion engine or the like being proposed as such power sources for the drive.

The invention is further directed to an apparatus mounted on a vehicle with wheels or a wheeled carriage, the motor thereof being adapted to drive the vehicle as well as the treatment rolls, feed conveyor etc. of the novel apparatus.

These and other objects of the invention will become further apparent from the following detailed description, reference being made to the accompanying drawing showing a preferred embodiment of the invention.

Fig. 1 is a diagrammatic side elevational view of a vehicle on which is mounted an apparatus embodying the invention together with the drive therefor.

Fig. 2 is a schematic view of a part of a scraping roll employable in the invention.

Figure 3:
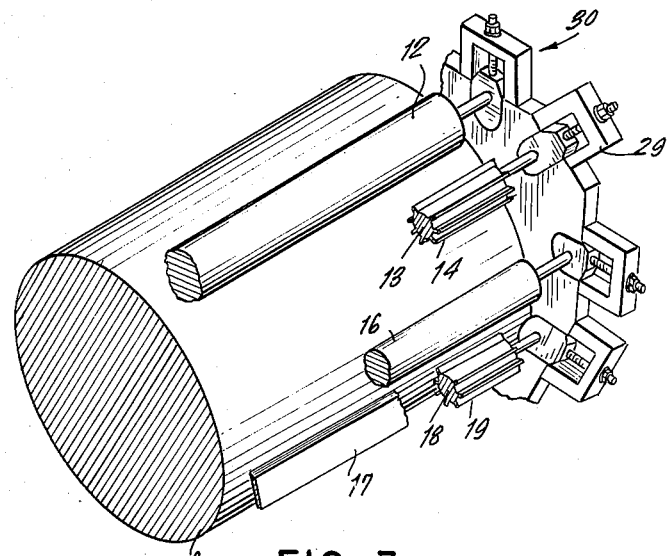
Fig. 3 is a perspective view of the apparatus shown in Fig. 1 with the side plate removed.

Referring now more particularly to the drawing, there is disclosed diagrammatically in Fig. 1 a vehicle frame 1 provided with wheels 2 for carrying an apparatus according to the invention which is adapted to break up vegetable or plant products into vegetable fibers and vegetable pulp. A feed conveyor 6 is driven by a motor 3 via a gearing 4 and chain or belt transmission drive 5. The same gearing also imparts rotation to squeezing or reducing rolls, as well as to scraping rolls and further to conveyor bands, as hereinafter more fully described. By means of one of the conveyor bands 7 the lengthy vegetable product from which filaments or fibers are to be drawn out, is fed to an apparatus or separator device 30. The conveyor band 7 terminates above feed conveyor 6, whereby at the one end of the conveyor band the supplied product is taken up by a squeezing or crushing roll 8 and then directed toward said feed conveyor 6.

In order to avoid any deviation of the product under treatment an intermediate roll 9 is interposed between the crushing or squeezing roll 8 and another squeezing roll 10 so as to bridge the space between said squeezing or crushing rolls 8 and 10. The distance between roll 10 and the feed conveyor 6 is smaller than the distance between the crushing or squeezing roll 8 and the conveyor band 7, so that the major portion of the vegetable juice resulting from such treatment will be extracted during the passage of the product between the aforesaid two squeezing rolls.

The juice due to its own weight runs between the end of the transporting band 7 and feed conveyor 6 downwardly, where it is caught or collected in any appropriate manner by a discharge channel or drain (not shown). Arranged adjacent said feed conveyor 6 is an elastic stripper plate 11, which prevents the extracted juice from flowing along the conveyor to the lower part thereof.

The feed conveyor 6 further guides the product under treatment past a further squeezing roll 12 to a scraping roll 13, which is provided with blades, paddles or ledges 14, having rounded edges and arranged with respect to each other along the periphery of said roll in such a manner that their longitudinal axes lie parallel to the axis of rotation of the scraping roll. These ledges may be made from metal, such as flexible stainless steel or from an elastic material, such as plastic, plastic composition or rubber.

Ledges 14 may be fixed to roll 13 by means of washers inserted into milled slots, and by screws, or if relatively soft material is used, terminal strips may be employed for mounting said ledges. In this manner the space between the individual respective ledges 14 remains free, so that a fan effect is attained which during rapid revolution will not be disturbed and the scraped vegetable pulp will be easily thrown off by the scraping roll 13, which runs at substantially higher peripheral speed than the conveyor and the rolls 8, 10, 12, 16 and 21 and is separately driven as are scraping rolls 18 and 23.

In order to avoid during centrifuging any escape of vegetable pulp in undesired direction, a curved splash board 15 is provided which protects and covers the right hand side of the apparatus.

Through conveyor 6 the filamentous product which is either entirely or partly removed from the pulp is then directed to a smooth roll 16 which fulfills the purpose of pressing said product which was loosened up by the scraping roll 13 against the surface of feed conveyor 6.

Adjacent roll 16 there is disposed a stripper plate 17 made from stainless steel which is springy and extends below the line of contact between roll 16 and feed conveyor 6 and is directed at an acute angle with respect to roll 16, so that fibers or similar filamentous material which adhere to roll 16 will be positively stripped off. This material, however, cannot adhere to the stripper plate 17 due to gravity.

The product which principally has changed already to the state of a filamentous band is thus again pressed onto the feed conveyor roll 6, arrives thereafter at a second scraping roll 18 provided with blades or ledges 19 which scrape off the last parts of the vegetable pulp. Roll 18 also throws these remaining parts of the vegetable pulp in outward direction so that said pulp hits the splash board 15 or is permitted to fall immediately into a device about to be described. The vegetable pulp centrifuged by scraper rolls 13 and 18 arrives either directly at or is fed lengthwise of the curved splash board 15 onto a transverse belt conveyor device 20 and is deviated by means of the latter in substantially parallel relation to the rolls. The conveyor 20 has a conveyor belt for moving the vegetable pulp away from the fibrous material.

Roll 16 with its smooth surface serves as a holding or retaining roll and is so spaced from the scraper roll 13 that the vegetable pulp scraped off will not in any event be received by smooth roll 16.

At about the lowermost location of the feed conveyor 6 there is also arranged a smooth roll 21 which serves as a retaining and deviation device and which coacts with a stripper or scraping roll 22 provided with ledges 23. Ledges 23 lift from the feed conveyor 6 a band of fibers and deviate or orient the latter toward the roll 21. Simultaneously ledges 23 of roll 22 liberate any vegetable pulp remaining on the fibrous material which ledges act on the underface of the band of fibers facing conveyor 6.

The scraper roll 22 throws the remaining parts of vegetable pulp in downward direction, from where it is discharged by means of a channel-shaped conveyor device (not shown). The opposite or rearward face of the stripper plate 11 is simultaneously used to prevent entrainment of portions of the vegetable pulp by the feed conveyor 6 in upward direction. The position of roll 22 is so chosen that it strips off the filamentous band either at the lowermost peripheral location of feed conveyor 6 or somewhat therebehind, in which case the weight of the filamentous material cooperates with the stripper plate 11, to free the fiber material from any residual pulp portions.

The filamentous band then runs about the deviation roll 21 to a suitable springy stripper plate 24 of springy stainless steel which is oriented toward roll 21 at such an angle, that the weight of the filamentous material avoids any jamming or damming action relative to said stripper plate.

The stripped off fibers then drop onto a conveyor band 25 disposed therebelow along which the fibers are fed substantially perpendicular to the rolls hereinabove mentioned. The conveyor band 25 extends normal to conveyor 20. The end of the conveyor band 25 ensures catching of dropping end pieces of the fibrous band, so that any felting or gluing together of fibrous parts will be prevented.

At the opposite end of the conveyor band 25 there may be arranged a further conveyor band 26 equipped with blades or ledges 27 or any other suitable transporting device, if desired. The arrangement of a conveyor band with blades or ledges below the discharge end of the conveyor band 25 has the advantage that the fibers dropped down from the conveyor band 25 are received in a loose state and may be easily taken off. It is, therefore, advantageous to arrange a stripper plate adjacent conveyor band 25, in order to separate and deviate any adherent liquid or sticky particles of pulp portions.

The apparatus hereinabove disclosed has also the advantage that deviation of fibers from the conveyor band due to the weight thereof is effectively prevented, so that no stripper or deviation plates become necessary, which would be otherwise required for filling up the space between pairs of rolls, to avoid clogging.

Due to the particular and most suitable arrangement of the squeezing and scraping rolls, the scraped off vegetable pulp is absolutely prevented from dropping on any portions of the vegetable product under treatment which is either to be freed from its fibers or is already devoid of fibers. Also collection of thrown off vegetable pulp portions on the treatment rolls or tools is not possible.

The fibers thus obtained will be taken off at the end of the operation in a positive manner and under the action of the weight of the fibrous end product.

The apparatus according to the invention operates without the supply or use of water, which is of great importance in the treatment and operation carried out in warm climatic regions. The apparatus is transportable from place to place and can be directly driven to plantations, where the product is harvested so that only the fibrous end product has to be transported and shipped away, while the scraped off vegetable pulp may be used, if desired, in situ as or in connection with fertilizers.

It can thus be seen that there has been provided in accordance with the invention an apparatus for treating lengthy vegetable products in order to disassociate vegetable pulp therefrom for obtaining fibrous material, said apparatus comprising a substantially horizontally movable conveyor band, a rotatable feed conveyor arranged at one end of said conveyor band, a plurality of treatment rolls arranged adjacent said feed conveyor, the axis of rotation of said feed conveyor extending in a plane angularly directed to the plane of movement of said conveyor band, and means for rotating said feed conveyor in the same direction as said treatment rolls at locations of the latter at which said rolls are in contact with said feed conveyor.

The aforesaid treatment rolls include a single smooth roll which is positioned adjacent said one end of said conveyor band and directly opposite the latter and remote from the feed conveyor, which is otherwise in operative contact with other treatment rolls grouped around said feed conveyor.

As may be further realized from the aforesaid disclosure the smooth and squeezing roll means may be readily adjusted in their position relative to the feed conveyor roll 6 by well known roller adjustment brackets 28. Adjustment brackets 29 are used in a similar manner to regulate the distance and pressure of the respective scraping roll means from the feed conveyor 6.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A device for separating filamentous material from vegetable matter comprising a first conveyor for advancing vegetable matter through a feed path, a curved conveyor adjacent said first conveyor disposed with its outer periphery adjacent said first conveyor to receive vegetable matter therefrom, a plurality of treatment rollers arranged about said curved conveyor, means for rotating said treatment rollers including means for rotating at least one of said treatment rollers at a faster speed than said curved conveyor, means for moving said first conveyor and said curved conveyor whereby to advance vegetable material between said curved conveyor and said treatment rollers, and a splash plate disposed to one side of said curved conveyor to deflect juices directed outwardly thereagainst as the vegetable matter is advanced between said curved conveyor and said treatment rollers.

2. A device for separating filamentous material from vegetable matter according to claim 1, wherein said treatment rollers include a crushing roller in contact with said curved conveyor and which effects together with said curved conveyor the crushing of material directed therebetween.

3. A device for separating filamentous material from vegetable matter comprising a first conveyor for advancing vegetable matter through a feed path, a curved conveyor disposed with its outer periphery adjacent said first conveyor to receive vegetable matter therefrom, crushing roller means overlying at least one of said first conveyor and curved conveyor to crush the vegetable matter being fed thereon, a scraper roller disposed to overlie said curved conveyor at a forward location in a direction of conveyor movement from said crushing roller means, and means for moving said first conveyor, said curved conveyor, said crushing roller means and said scraping roller, including means to rotate said scraper roller at a faster speed than said curved conveyor.

4. A device for separating filamentous material from vegetable matter according to claim 1, wherein said curved conveyor is substantially cylindrical and including a plurality of crushing rollers and scraping rollers spaced around the periphery thereof.

5. A device for separating filamentous material from vegetable matter according to claim 3, wherein said scraper roller includes a plurality of outstanding paddle members.

6. A device for separating filamentous material from vegetable matter according to claim 3, including at least one stripper plate disposed substantially tangential to said curved conveyor to strip filamentous material therefrom.

7. A device for separating filamentous material from vegetable matter according to claim 3, including a second conveyor disposed adjacent said curved conveyor and adapted to receive filamentous material delivered by said curved conveyor after contact by said crushing rollers and stripper roller.

8. An apparatus according to claim 1, including a vehicle provided with a frame, a power source mounted on said frame, means transmitting rotational movement from said power source to said curved conveyor, and means for mounting said curved conveyor and said treatment rolls on said frame.

References Cited in the file of this patent
UNITED STATES PATENTS

| | | |
|---|---|---|
| 308,839 | Gibson | Dec. 2, 1884 |
| 394,284 | Menzies | Dec. 11, 1888 |
| 468,632 | Allison | Feb. 9, 1892 |
| 772,823 | Pos | Oct. 18, 1904 |
| 1,315,521 | Maddock et al. | Sept. 9, 1919 |
| 2,399,809 | Kaiser | May 7, 1946 |